May 16, 1939.  J. R. ELSEY  2,158,226
FEEDING DEVICE
Filed Aug. 2, 1937
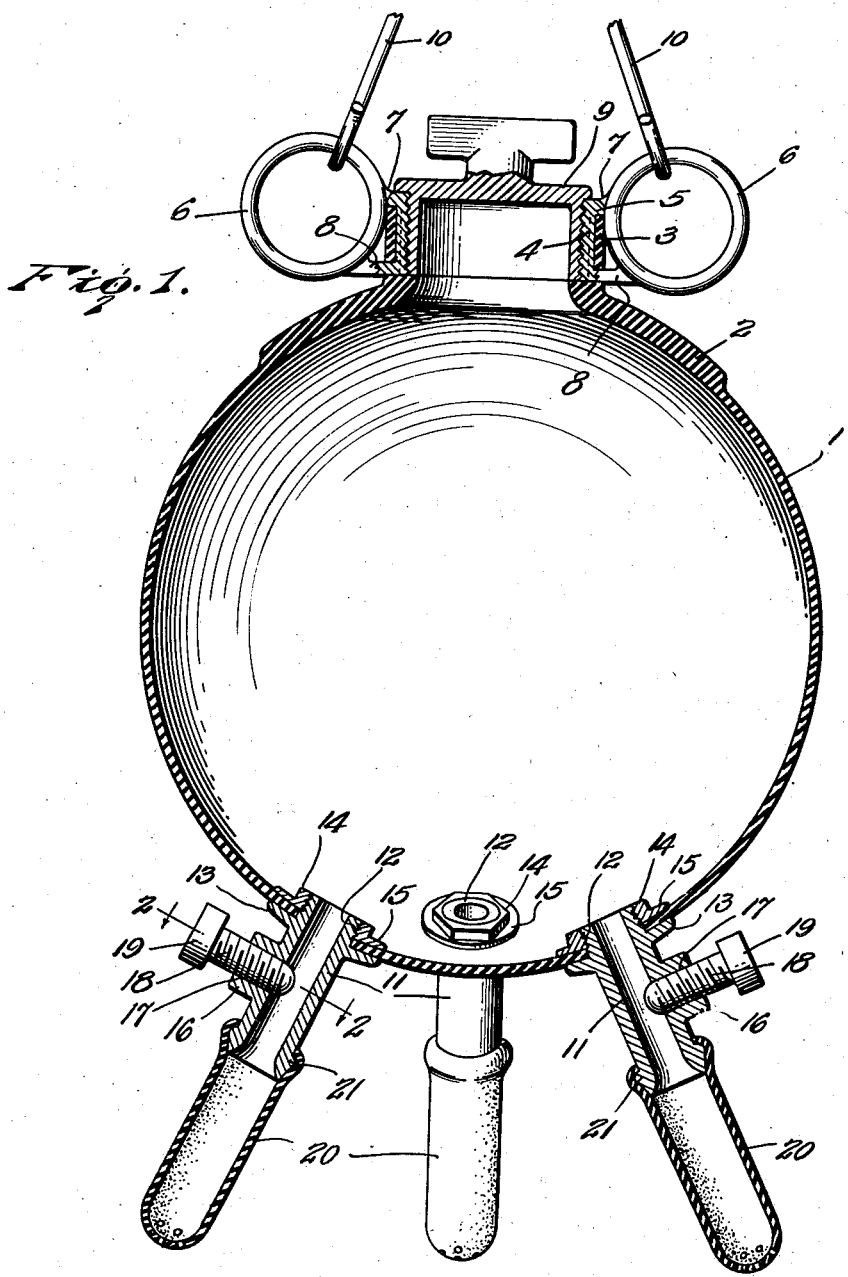
Fig. 1.
Fig. 2.
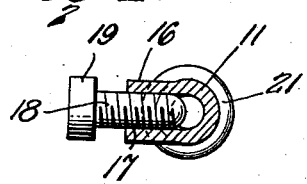
Inventor
James R. Elsey.
By Lacey & Lacey
Attorneys Patented May 16, 1939

2,158,226

UNITED STATES PATENT OFFICE 2,158,226

FEEDING DEVICE

James R. Elsey, Maplewood, Mo.

Application August 2, 1937, Serial No. 157,015

2 Claims. (Cl. 119—71)

This invention relates to a feeding device and more particularly to a device of this character intended for feeding young animals, such as lambs or calves, which have been taken from their mothers and must be fed by artificial means in order that they may survive during the interval of time when their diet consists only of milk. The device will also be found useful in stock yards, slaughter houses and other establishments where it is desired to preserve the young animals in a healthy condition until they are killed and dressed for use as meat.

One object of the invention is to provide a device of this character which may be suspended from an overhead support and consists of a bag constituting a container for a quantity of milk and having a number of outlets carrying nipples. It will thus be seen that the device will in many respects correspond to the bag of a milch cow or sheep from which the young animals have been taken and permit the young animals to feed in a natural manner.

Another object of the invention is to provide a device of this character of such construction that one or more young animals can feed from the same without interfering with each other.

It is another object of the invention to so construct the outlet for the container that flow of milk through the same may be controlled and thus prevent the milk from flowing too freely when suction is exerted through the openings in the nipples.

It is another object of the invention to provide a device of this character which may be easily and quickly filled through an opening in its top and a closure for this opening then applied so that flow of air through the filling opening will be prevented and discharge of milk through the nipple prevented from taking place except when an animal is feeding.

The invention is illustrated in the accompanying drawing, wherein:

Figure 1 is a sectional view taken vertically through the improved feeding device, and Figure 2 is a sectional view taken transversely through one of the outlets along the line 2—2 of Figure 1.

The container or bag 1 of this improved feeding device is formed of soft rubber although it may be formed of any other desired material, and while it has been shown spherical in shape, it is to be understood that it may be of any desired outline. The upper portion of the bag or container has its walls externally thickened to provide a reinforced portion 2 from which extends a neck 3 which fits about an internally threaded sleeve 4 formed of metal. The sleeve is formed at its upper end with an outstanding annular flange 5 which overhangs the upper edge of the neck 3 and in order to suspend the feeding device from an overhead support there have been provided rings 6 which are disposed at opposite sides of the sleeve and connected therewith by upper webs 7 and lower arms 8. The upper web unites the rings to the outstanding flange 5 of the sleeve and the arms 8 are united to the lower end portion of the sleeve and have portions passing through the neck 3. It will be understood that the sleeve must be molded into the neck of the bag during formation of the bag, and that since the arms 8 extend through the neck, the sleeve will be firmly held in the neck and prevented from turning therein. Therefore, a cap 9 may be screwed tightly into the sleeve after the bag has been filled with milk and a tight closure provided which will prevent the milk from being spilled and also prevent passage of air into the bag through the sleeve. Hooks 10 or equivalent members which are engaged with the ring are employed to suspend the feeding device from an overhead support.

In order to permit young animals to feed from this device, there have been provided a plurality of discharge nozzles 11 which may be three in number or any other desired number. These nozzles are formed of metal and each has its upper end portion threaded, as shown at 12, and adjacent this upper end portion each nozzle carries a circumferentially extending flange 13 so that, when the threaded end portion 12 of the nozzle is passed through an opening formed in the bag or container 1 and a nut 14 formed with a flange 15 screwed into place, portions of the rubber bag will be firmly gripped between the flanges 13 and the flanged end of the nut and the nozzle very firmly held in place and leakage about the nozzle prevented. A neck 16 extends laterally from the nozzle intermediate the length thereof and is formed with a threaded bore 17 through which a threaded valve stem 18 is engaged, and it will be readily understood that by grasping the turning head 19 of the outer end of a stem, the stem may be turned in a direction to move it inwardly or outwardly. When the valve stem is turned inwardly, it is moved across the bore of the nozzle to partially or entirely block the same. Therefore, flow of milk through the nozzle may be controlled and entirely cut off if so desired. Rubber nipples are engaged about the flange ends 21 of the nozzles so that they will be securely held in place for use by the small animals when feeding. These nipples may be removed when cleaning or replacement is necessary.

When this improved feed bag is to be used, the valves of the nozzles will be closed and the cap 9 removed. A quantity of milk can then be poured into the bag through the filling neck and the cap then replaced. The rings 6 may be employed as hand-holds while carrying the filled bag to the place where it is to be used and the rings then engaged with the hooks 10 to suspend the bag from an overhead support. After the bag has been suspended the valves 18 may be opened to permit flow of milk through the nozzle and out of the nipples when the nipples are subjected to suction by the feeding animal. In view of the fact that the cap 9 is screwed tightly into place, passage of air into the bag through the filling neck will be prevented and the milk will only flow from the nozzle when an animal is feeding. As the bag is provided with a number of nozzles and nipples carried thereby, a corresponding number of animals may feed from the bag at the same time. When the bag has been emptied, the nipples 20 may be removed, the valves fully opened and the cap removed. The interior of the bag and also the nozzles and the nipples may then be thoroughly washed.

Having thus described the invention, what is claimed as new is:

1. A feeding device of the character described comprising a container formed of soft flexible material and having its upper portion thickened and formed with an upstanding neck, an internally threaded sleeve of rigid material mounted in the neck and having an upper upstanding flange overlying said neck, arms extending from said sleeve laterally from said neck, suspending means carried by said arms, a cap screwed into said sleeve and constituting a removable closure for tightly closing the neck, and discharge means extending downwardly from the lower portion of the container.

2. A device of the character described comprising a container of soft flexible material having its upper portion formed with an upstanding filling neck, a sleeve of rigid material mounted in said neck and having portions extending through and laterally from sides of the neck and terminating in members for suspending the container from an overhead support, a removable closure for said neck, and discharge means extending downwardly from said container.

JAMES R. ELSEY.